United States Patent [19]
Dusheck, Jr.

[11] 3,879,720
[45] Apr. 22, 1975

[54] ENERGY PEAK/TIME AVERAGING SEISMIC INTRUSION DETECTOR

[75] Inventor: George James Dusheck, Jr., Cinnaminson, N.J.

[73] Assignee: RCA Corporation, New York, N.Y.

[22] Filed: Oct. 18, 1973

[21] Appl. No.: 407,469

[52] U.S. Cl............... 340/261; 340/258 R; 340/276
[51] Int. Cl. ........................................ G08b 13/00
[58] Field of Search................ 340/261, 258 R, 276

[56] References Cited
UNITED STATES PATENTS

| | | | |
|---|---|---|---|
| 3,686,658 | 8/1972 | Wilt................................. | 340/261 |
| 3,696,369 | 10/1972 | Laymon et al..................... | 340/261 |
| 3,745,552 | 7/1973 | Wilt................................. | 340/261 |

*Primary Examiner*—Glen R. Swann, II
*Attorney, Agent, or Firm*—Edward J. Norton; Joseph S. Tripoli

[57] ABSTRACT

An energy peak/time averaging seismic intrusion detector (ETSID) includes means to detect energy peaks in seismic signals resulting from an intruder's footfalls. The period of the detected energy peaks is determined by time averaging circuitry which, in turn, provides signals representative of the period of each energy peak and the average periodicity of the detected energy peaks. Thereafter, the consistency of the periodicity of the energy peaks is determined by comparing the signals which represent the period of each energy peak to the signal representing the average periodicity. When the consistency of the energy peaks in the seismic signals satisfies predetermined criteria, a decision circuit provides an intruder alarm.

15 Claims, 4 Drawing Figures

W = MAXIMUM CONSISTENCY PULSE WIDTH FOR GIVEN PEAK RATE CONDITIONS

ENERGY PEAK/TIME AVERAGING SEISMIC INTRUSION DETECTOR

BACKGROUND OF THE INVENTION

This invention relates to seismic intrusion detection systems and, more particularly, to such systems wherein the consistency of detected seismic signals is utilized as a detection decision criterion.

Seismic sensors presently are being deployed in several commercial and military applications, to provide both protective warning for perimeter defense and to obtain intelligence for field surveillance and/or reconnaissance missions. In these applications, the sensors must perform some degree of signal processing to minimize the amount of information transmitted to a central station. In reconnaissance applications, where long unattended service is required, sensor processing can conserve battery power and minimize detection of the sensors by the intruders. Systems or arrangements for signal processing for such systems are known in the prior art, as exemplified by U.S. Pat. Nos. 3,696,369 and 3,691,549.

Many simple seismic detection systems which employ a geophone and relatively simple preprocessing, have limited target descrimination capability and consequently have an undesirably high false alarm rate. Although these simple preprocessors are inexpensive and have low power consumption, the relatively high transmitter power required to transmit false alarms and the low confidence placed on real alarms due to high false alarms rates, negate the advantages of the simple preprocessor. More complex processing techniques — such as, for example, computer-assisted autocorrelation techniques — do yield more accurate signal descrimination, but at an unjustifiable increase in complexity and cost relative to their intended applications.

The seismic intrusion detector of the present invention, derives simple features from the amplitude/time domain which are inherent to seismic footfall signals and derived in such a manner as to reject man-made and natural background noise sources. These background sources include generators, aircraft, gound vehicles, etc., in the case of man-made noise; and, wind, rain, thunder, animals and earth tremors, in the case of natural background noise.

SUMMARY OF THE INVENTION

Briefly, the present invention provides a seismic intrusion detector comprising input means for receiving seismic energy signals. The detector includes means responsive to the detecting means for producing a first signal having a time-varying amplitude component indicative of the period of each of the energy peaks and having an amplitude proportional to the rate of the detected energy peaks. Means are provided for producing a second signal indicative of the average amplitude of the first signal. The detector further includes means for comparing the first and second signals to provide a third signal when the time varying component of the first signal is consistently within a predetermined range about the second signal.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

By way of introduction, the present invention incorporates a new signal processing technique which detects seismic signals resulting from footfalls using an amplitude ratio technique, and which discriminates against non-footfall seismic signals through the use of a periodic feature requirement. The energy-peak/time-averaging intrusion detector (ETSID), as I prefer to identify it, utilizes two basic footfall characteristics: (1) footfalls generate bursts or peaks of seismic energy, and (2) footfalls are periodic. Accordingly, if the consistency of the footfall rate is determined, a consistency requirement can be used as a criterion for the intrusion detector decision circuitry output.

Figure 1:
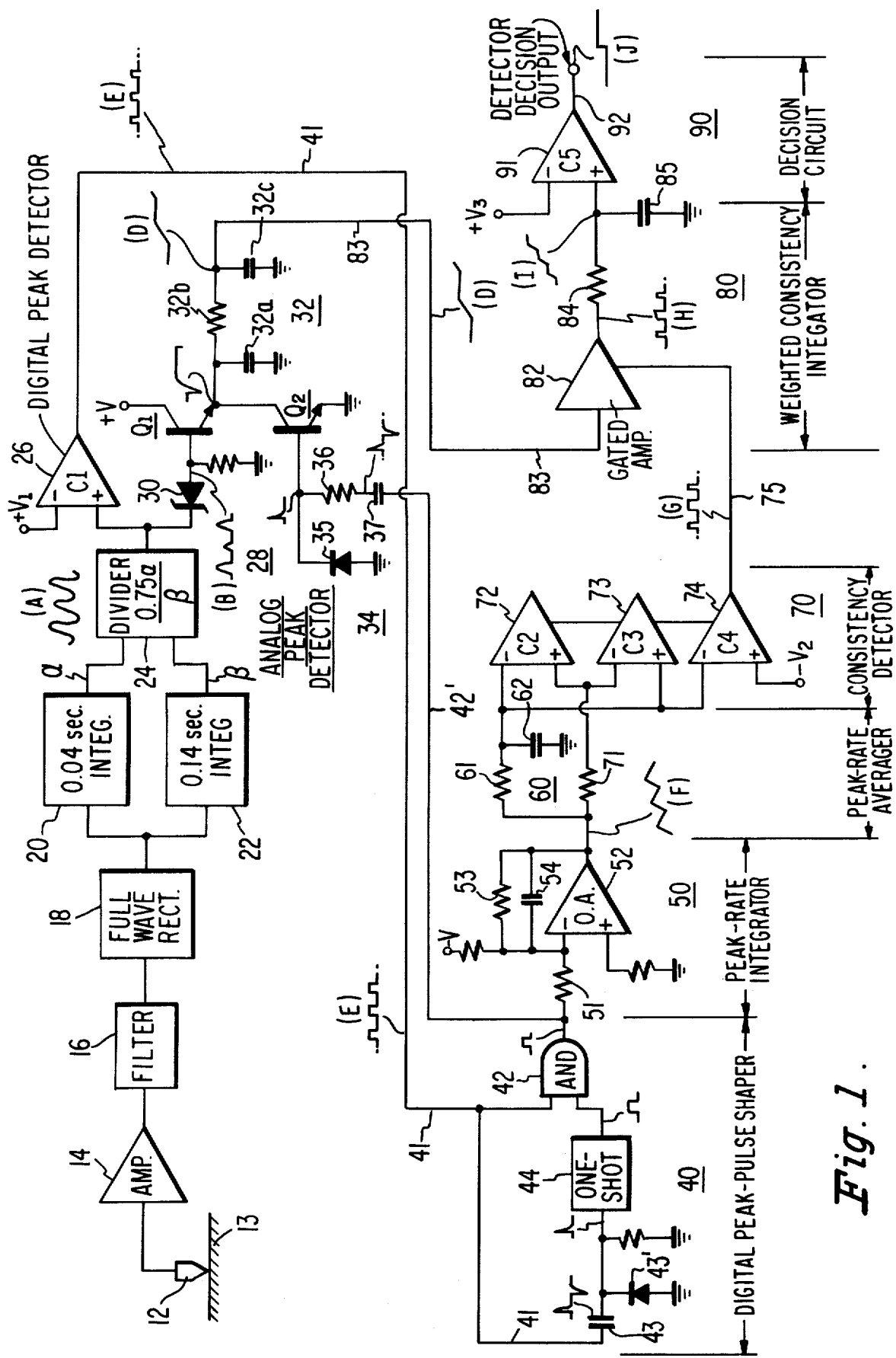
FIG. 1 is a combination block and schematic diagram of a seismic intrusion detector embodying this invention.

Referring now to FIG. 1, there is shown a preferred embodiment of the present invention. A seismic sensor 12, which may be a geophone or any other suitable transducer, is placed in contact with, or implanted in, the earth 13. A seismic vibration in the earth is detected by sensor 12 which produces an electrical seismic signal at its output. The output of sensor 12 is coupled to amplifier 14 which functions to amplify the output signal from sensor 12. The output of amplifier 14 is coupled to filter 16 which provides a bandpass circuit for reducing the system response to both unwanted low frequency signals and high frequency noise outside of the normal frequency range of intrusion signals. In currently preferred practice, the bandpass of filter 16 ranges from 9 to 50 Hz. The output of filter 16 is coupled to full wave rectifier 18 which, in turn, rectifies the seismic signals in order to facilitate further processing.

The output of rectifier 18 is coupled to a short-time-constant integrator 20 whose time constant is preferably on the order of 0.04 seconds. The output of rectifier 18 is also coupled to a long-time-constant integrator 22 whose time constant is preferably on the order of 0.14 seconds. Accordingly, the output of integrator 20 provides instantaneous seismic signal energy, while the output of integrator 22 provides a short-term average of the seismic signal energy.

The outputs of integrators 20 and 22, designated as $\alpha$ and $\beta$ respectively, are coupled to the input of a divider circuit 24. Divider 24 combines outputs $\alpha$ and $\beta$ in such a manner that the output of divider 24 provides a ratio of instantaneous energy to the short-term or average energy of the seismic signals.

Divider 24 may comprise any one of a number of known devices. By way of example, divider 24 may comprise an Analog Devices AD 530 integrated circuit divider. Divider 24 may also comprise first and second logarithmic amplifiers having inputs respectively coupled to $\alpha$ and $\beta$ and having commonly coupled outputs. In currently preferred practice divider 24 combines $\alpha$ and $\beta$ in accordance with a $0.75\alpha/\beta$ weighting factor.

The presence of a burst of instantaneous seismic energy, such as that caused by a footfall, will cause the energy in short-time-constant integrator 20 to rise rapidly, thereby increasing the output ratio of divider 24. Thus, divider 24 functions to provide an energy ratio signal indicative of the ratio of instantaneous energy to average energy in the seismic signals. Accordingly, a burst of seismic energy results in an energy peak signal at the output of divider 24. It should be noted that since the detection of seismic bursts using this energy ratio technique, in accordance with the present invention, is independent of input signal level or gain, the requirement for automatic gain circuitry in the earlier stages of the intrusion detector system, which requirement is characteristic of many prior art systems, is accordingly avoided.

The output of divider 24 is coupled to a DIGITAL PEAK DETECTOR 26 and to an ANALOG PEAK DETECTOR shown generally at 28. DETECTOR 26 may comprise a comparator, a Schmitt trigger, an operational amplifier arranged as a comparator or any other suitable threshold device. In FIG. 1, DETECTOR 26 takes the form of a conventional comparator and is accordingly labeled C1. The − input of DETECTOR 26 is coupled to a fixed reference potential $V_1$, and the + input of DETECTOR 26 is coupled to the output of divider 24. The output of DETECTOR 26 is coupled to lead 41.

DETECTOR 26 provides a digital (binary logic 1) output whenever an input signal applied to its + input is greater in magnitude than the reference potential $V_1$ applied to its − input. Accordingly, the output of DETECTOR 26 provides a digital peak-pulse whenever the energy ratio signal provided by divider 24 exceeds a given threshold as determined by the values of reference potential $V_1$.

The output of divider 24 is coupled to the base of an NPN transistor $Q_1$ of ANALOG PEAK DETECTOR 28 by way of a Zener diode 30. The collector of transistor $Q_1$ is coupled to a fixed potential $+V$. The emitter of transistor $Q_1$ is coupled to the collector of a second NPN transistor $Q_2$ and to the input of a filter circuit 32. The emitter of transistor $Q_2$ is coupled to a fixed point of reference potential schematically represented as ground. The base of transistor $Q_2$ is coupled to the output of a differentiating circuit 34 which comprises a clipping diode 35, a resistor 36 and a capacitor 37. The input of differentiating circuit 34 is provided by way of capacitor 37. The leading or positive going edge of a pulse applied to circuit 34 by way of capacitor 37 causes transistor $Q_2$ to momentarily conduct heavily. Filter circuit 32, which is arranged as a low pass filter or integrator, provides an analog signal output from ANALOG PEAK DETECTOR 28.

Referring now to the operation of ANALOG PEAK DETECTOR 28, when the voltage level of the energy ratio signal at the output of divider 24 exceeds the threshold voltage of Zener diode 30, transistor $Q_1$ begins to conduct, and continues to conduct up to the maximum peak value of the energy ratio signal. Transistor $Q_1$ acts as an emitter follower and the signal at its emitter follows that of the input signal once the threshold of the Zener diode 30 is exceeded. Accordingly, the voltage on capacitor 32a of filter network 32 increases up to the peak value of the energy ratio signal minus Zener diode 30 voltage drop and the $V_{BE}$ drop of $Q_1$ (peak threshold voltage). When the energy ratio signal begins to decrease below its peak value, the base-emitter junction of transistor $Q_1$ becomes back-biased and transistor $Q_1$ turns off. However, the maximum or peak signal voltage in excess of the peak threshold value nevertheless remains across capacitor 32a of filter 32. The voltage stored across capacitor 32a is filtered and integrated by a resistor 32b and a capacitor 32c, to thereby provide an average maximum signal in response to the energy ratio signal.

As will be discussed more fully hereinafter, the leading edge of each peak-pulse, detected by DIGITAL PEAK DETECTOR 26, causes transistor $Q_2$ to conduct heavily, thereby discharging capacitor 32a. Thus, the maximum peak level of each detected energy ratio signal peak is held until another energy ratio signal peak is detected; at that time, the past held maximum peak level is removed by discharging capacitor 32a thereby allowing the circuit to follow the new energy ratio signal to its maximum peak level. The held maximum peak level signal is integrated by filter 32 to form an average maximum peak level signal. This integrated signal, which provides a measure of the strength of the detected seismic signals, is utilized to enhance the operation of the intrusion detection decision circuitry as discussed more fully hereinbelow.

The detected digital peak-pulses from DETECTOR 26 are coupled to DIGITAL PEAK-PULSE SHAPER 40 by way of lead 41. Lead 41 is coupled to a first input of AND gate 42 and to a differentiating capacitor 43. The leading and trailing edge of each detected peak-pulse is differentiated by capacitor 43 to form a pulse pair wherein the negative going or trailing edge pulse is clipped by a diode 43' and the remaining pulse, representing the leading edge of each peak-pulse, is coupled as an input to a ONE-SHOT (MULTIVIBRATOR) 44. The output of ONE-SHOT 44 provides a shaped pulse having a fixed pulse-width. The output of ONE-SHOT 44 is coupled as a second input to AND gate 42. The output of DIGITAL PEAK-PULSE SHAPER 40 is taken from the output of AND gate 42. Accordingly, the output of PEAK-PULSE SHAPER 40 provides a width-limited output pulse in response to the simultaneous presence of a detected digital peak-pulse and the output of ONE-SHOT 44, wherein the duration of the output pulse is equal to or less than the duration of the output pulse of ONE-SHOT 44. The output of AND gate 42 is also coupled to capacitor 37 of differentiating circuit 34 by way of lead 42'.

The width-limited peak-pulse output of PEAK-PULSE SHAPER 40 is then applied to a PEAK-RATE INTEGRATOR 50 by way of a resistor 51. INTEGRATOR 50 preferably takes the form of an operational amplifier 52 having a high pass filter comprising a resistor 53 and a capacitor 54 connected between the output and input thereof to form an integrator or low-pass filter. Amplifier 52 of FIG. 1 provides a negative polarity output voltage. The output of INTEGRATOR 50 provides a sawtooth waveform signal in response to each detected digital peak-pulse and the period associated therewith. That is, INTEGRATOR 50 charges during the duration of each width-limited peak-pulse and discharges during the intervals between detected peak-pulses. The total period of each sawtooth waveform is therefore indicative of the period of a corresponding detected digital peak-pulse. Since each detected peak-pulse applied to the input of INTEGRATOR 50 exhibits a fixed or constant amplitude, the charging or leading edge of each sawtooth waveform is linear; and, since the selected R-C time constant of resistor 53 and capacitor 54 is substantially greater than the maximum duration of each detected peak-pulse, the discharging or trailing edge of the sawtooth waveform is also relatively linear.

It should be noted that the level of this sawtooth waveform output signal is proportional to the average rate of energy peaks detected. That is, the amplitude of the dc output from INTEGRATOR 50 is proportional to the average rate of digital peak-pulses, provided by PULSE-SHAPER 40, detected during a preceeding time interval. Thus, the output signal provided by INTEGRATOR 50 can be described as a sawtooth signal having a dc amplitude proportional to the average rate of the detected peaks and a time-varying amplitude component indicative of the period of each detected peak. The output signal provided by INTEGRATOR 50 is hereinafter referred to as "peak-rate sawtooth signal."

The above-mentioned preceeding time interval is determined by the R-C time constant provided by resistor 53 and capacitor 54. For walking man seismic intrusion detector applications, where the objective is to distinguish footfalls from background noise and where the average footfall rate is on the order of two footfalls per second, it has been found that a suitable R-C time constant for INTEGRATOR 50 is on the order of 2 seconds.

The peak-rate sawtooth signal output of PEAK-RATE INTEGRATOR 50 is coupled to a PEAK-RATE AVERAGER 60 which comprises a resistor 61 and a capacitor 62. The output of PEAK-RATE INTEGRATOR 50 is also coupled to a CONSISTENCY DETECTOR 70 which comprises comparators 72, 73 and 74. PEAK RATE AVERAGER 60, which preferably takes the form of a simple capacitive integrator, determines the average of energy peak rates detected during a preceeding time interval as determined by its R-C time constant. Since AVERAGER 60 is responsive to the output of INTEGRATOR 50, the signal developed by AVERAGER 60 is also indicative of the average amplitude of the peak-rate sawtooth signal of INTEGRATOR 50.

The peak-rate average signal provided by AVERAGER 60 is coupled as a first input to comparators 72, 73 and 74 of CONSISTENCY DETECTOR 70. The other inputs of comparators 72 and 73 are coupled to the peak-rate sawtooth signal output of INTEGRATOR 50 by way of resistor 71. The other input of comparator 74 is coupled to a reference potential $-V_2$.

Each one of comparators 72-74 may take the form of a conventional comparator, a Schmitt trigger, an operational amplifier arranged as a comparator or any other suitable threshold device. Comparators 72–74 are internally interconnected so as to provide a binary logic 1 at their common output lead 75 when the peak-rate average signal, provided by AVERAGER 60, is within "predetermined range limits" of the peak-rate sawtooth signal, provided by INTEGRATOR 50.

The time-varying sawtooth waveform has a leading edge amplitude equal to A, which is determined by the charging time of the PEAK-RATE INTEGRATOR 50. As previously discussed, the maximum charging time is controlled by the maximum width of the width-limited peak pulses. Thus, the maximum amplitude A is a known, given value. Accordingly, the "predetermined limits" may be selected as a predetermined portion of amplitude A. Comparators 72 and 73 may include off-set reference voltages in order to establish the desired "predetermined limits." In currently preferred practice, comparators 72 and 73 are of the type which include internal off-set voltage adjustments to facilitate adjustment of the desired "predetermined limits" of CONSISTENCY DETECTOR 70. It has been found that a range of $\pm 0.15A$ provides good results.

Comparators 72 and 73 function to compare the peak-rate average signal provided by AVERAGER 60 to the time-varying peak-rate sawtooth signal (and its associated average level) provided by INTEGRATOR 50. When the amplitude of the time-varying sawtooth component of the peak-rate sawtooth signal is within the predetermined range limits about the amplitude of the peak-rate average signal, provided by AVERAGER 60, a binary consistency output signal is provided by CONSISTENCY DETECTOR 70 on lead 75. Comparator 74 functions to provide a minimum threshold value which must be exceeded by the peak-rate average signal before CONSISTENCY DETECTOR 70 provides an output. That is, the negative voltage magnitude of the peak-rate average signal must exceed a predetermined value $(-V_2)$ before an output signal is provided on lead 75. Accordingly, comparator 74 functions to reject low peak-rate average signal conditions by inhibiting the output of CONSISTENCY DETECTOR 70 until a minimum average signal threshold is exceeded.

Figure 2A:
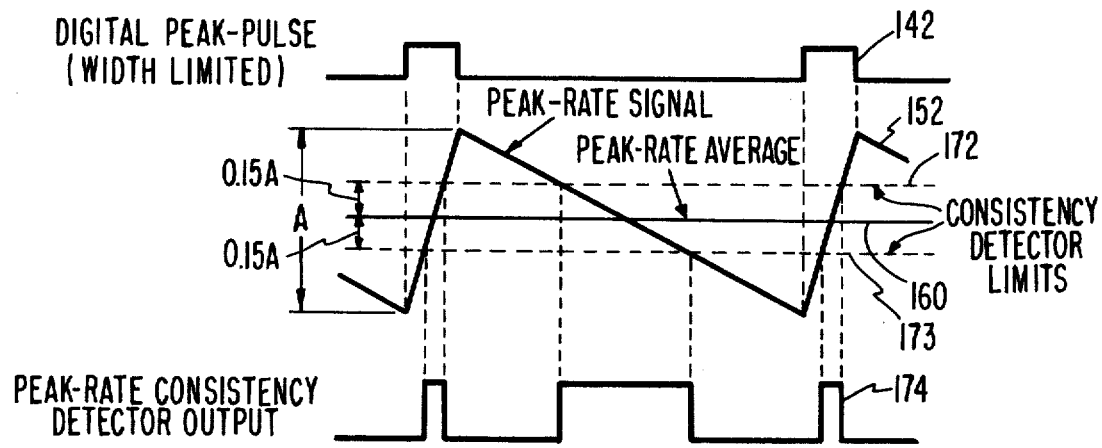
FIGS. 2a and 2b provide waveforms useful in explaining the operation of the peak-rate averaging and consistency detection circuits corresponding to the embodiment of FIG. 1.
Figure 2B:
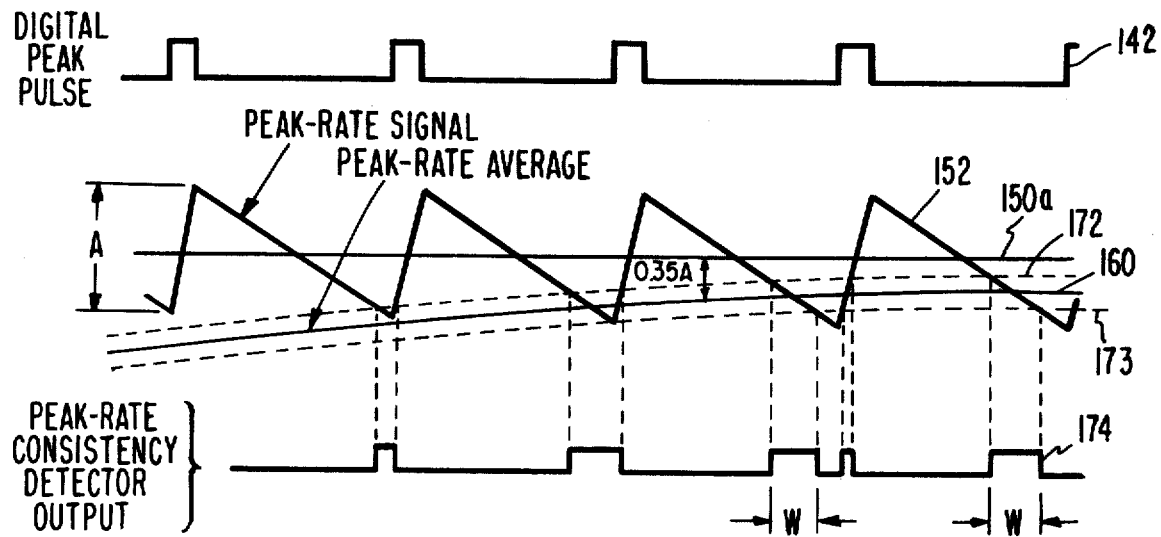

Referring now to FIGS. 2a and 2b there are shown waveforms useful in describing the operation of CONSISTENCY DETECTOR 70 of FIG. 1. In FIG. 2a the waveform provided at the output of AND gate 42 is shown by curve 142. The peak-rate sawtooth signal of INTEGRATOR 50 is shown by curve 152. The output of CONSISTENCY DETECTOR 70 is depicted by curve 174. The peak-rate average signal, as provided by AVERAGER 60, is depicted by curve 160 and the corresponding predetermined limits of CONSISTENCY DETECTOR 70 are represented by dashed lines 172 and 173.

FIG. 2a illustrates a hypothetical situation where the average value of the peak-rate sawtooth signal is equal to the peak-rate average signal 160. This situation arises when the period the time-varying sawtooth component of the peak-rate sawtooth signal is substantially equal to the periods of the previously detected peak pulses. Thus, it should now be apparent that if detected energy peaks in the seismic signals (such as that caused by footfalls) occur at a regular rate, the peak-rate sawtooth signal, provided by INTEGRATOR 50, will periodically (i.e. at the footfall rate) pass through the peak-rate average signal aperture, thereby causing the periodic generation of a pulsed binary consistency output signal at the output of CONSISTENCY DETECTOR 70. As previously discussed, this aperture is provided by the "predetermined limits" of CONSISTENCY DETECTOR 70.

Referring now more specifically to FIG. 2b there is shown an illustrative presentation of four peak-rate sawtooth signals as provided by PEAK RATE INTE- GRATOR 50. The average amplitude of these sawtooth signals is depicted by line 150a and the peak-rate average signal is depicted by line 160. The corresponding predetermined limits of CONSISTENCY DETECTOR 70 are illustrated by curves 172 and 173. As the peak-rate average signal approaches the average amplitude of the sawtooth waveform signals, or vice versa, CONSISTENCY DETECTOR 70 generates an increasing-width binary pulse until the averages of both signals are within 35 percent of the total peak-rate sawtooth amplitude variation (A) of each other. At that point a fixed width (W) binary consistency output signal is generated. Stated differently, the average value of the sawtooth signal from INTEGRATOR 50 can vary ±35 percent about the peak-rate average signal without reducing the width (W) of the binary consistency output signal. This 35 percent figure represents the difference between 0.5A and 0.15A, i.e. 0.35A. That is, since the aperture provided by the consistency detector limits extends ±0.15A, or 0.3A, the position of this aperture can vary 0.7A, or ±0.7A/2, without reducing the width W of the binary consistency output signal.

An important characteristic of CONSISTENCY DETECTOR 70 is that the DC level of its binary consistency output pulses, a level that is used indirectly in the intrusion detection decision, is relatively independent of the peak energy (footfall) rate. For example, if an intruder or intruders reduce their walking or running speed a corresponding reduction in peak-pulse sawtooth and peak-rate average signals occur. However, due to the fixed predetermined voltage limits of CONSISTENCY DETECTOR 70 and the reduction of the PEAK RATE INTEGRATOR 50 discharge rate (due to its correspondingly lower DC level), the peak-rate sawtooth signal will take more time to pass through the predetermined limits about the peak-rate average signal, therefore generating a wider binary consistency output pulse. Accordingly, as the energy peak rate decreases, the rate of the binary consistency output pulses decreases but the pulse width (W) increases resulting in a constant DC output. In effect, the integrated value of the consistency signal remains constant regardless of the actual walking or running speed.

Returning now to the description of the remaining elements of FIG. 1, the binary consistency output from CONSISTENCY DETECTOR 70 is applied to a WEIGHTED CONSISTENCY INTEGRATOR 80 by way of lead 75. CONSISTENCY INTEGRATOR 80 comprises a gated amplifier 82. Output lead 75 from DETECTOR 70 is coupled to a gating input of amplifier 82. An analog or signal input of amplifier 82 is coupled to the output ANALOG PEAK DETECTOR 28 by way of lead 83. Gated amplifier 82 functions to provide analog output pulses having the same pulse width as the binary consistency output pulses provided at gating input 75 by CONSISTENCY DETECTOR 70. However, the amplitude of the output signal from amplifier 82 is weighted in accordance with the average maximum peak level from ANALOG PEAK DETECTOR 28. Accordingly, the output pulses from amplifier 82 are weighted with an analog signal whose analog value is a measure of the strength of the detected seismic signals. The weighted binary consistency output signal of amplifier 82 is coupled by way of a resistor 84 to a final integrating capacitor 85. Integrating capacitor 85 acts to integrate the weighted binary consistency output signals of amplifier 82 to provide an integrated weighted consistency signal as the output of WEIGHTED CONSISTENCY INTEGRATOR 80.

The output of INTEGRATOR 80 is coupled to an input of a DECISION CIRCUIT 90 at the + input of a final comparator 91. The − input of comparator 91 is coupled to a fixed reference potential +$V_3$. DECISION CIRCUIT 90 provides a threshold circuit wherein the output 92 of comparator 91 provides an intrusion decision output when the value of the integrated weighted consistency output signal from INTEGRATOR 80 exceeds a given threshold value. The intrusion decision output can be coupled to an external alarm circuit or utilization device (not shown) in the usual manner.

Figure 3:
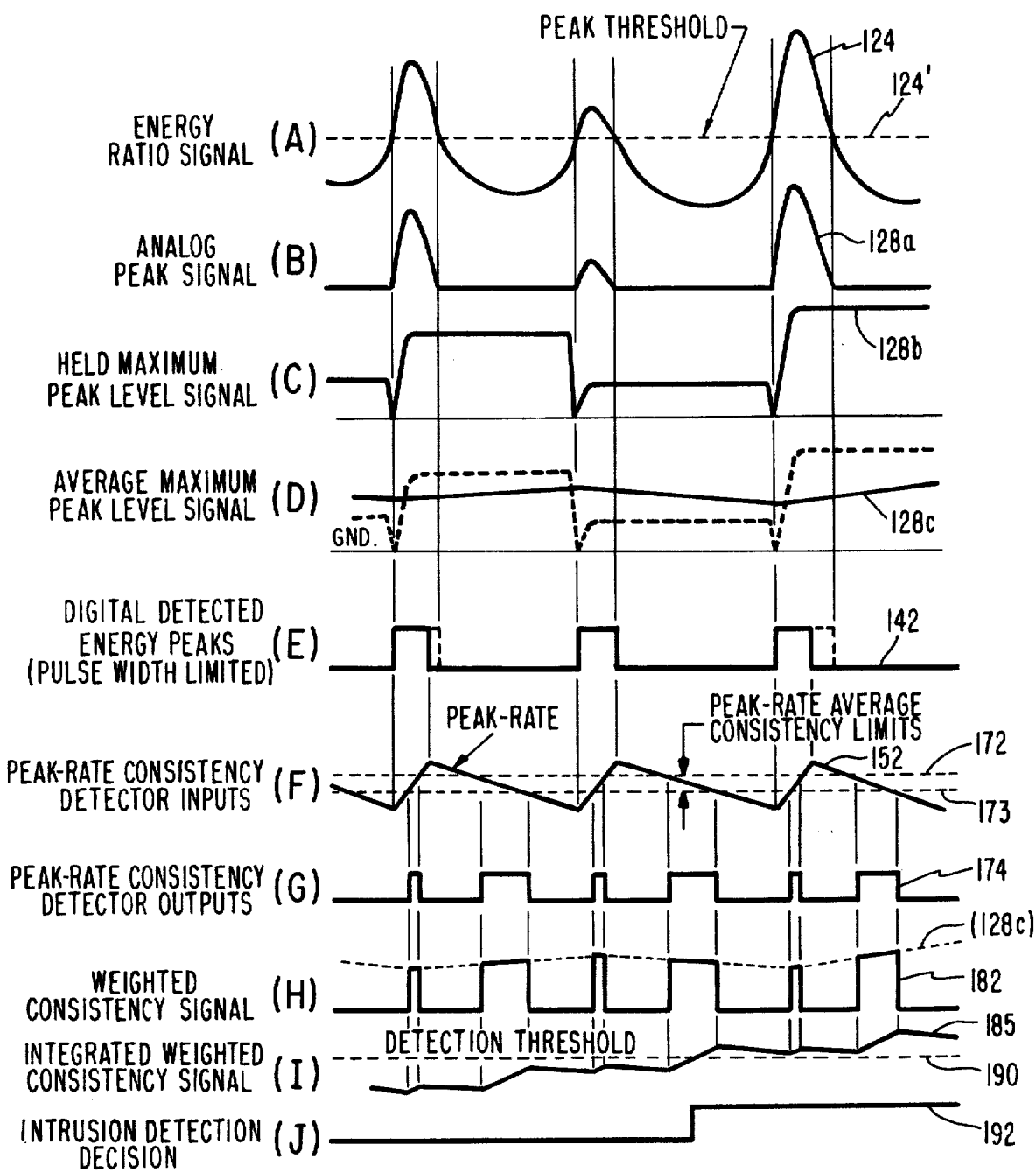
FIG. 3 provides waveforms useful in explaining the overall operation of the present invention as depicted in the embodiment of FIG. 1.

The operation of the system of FIG. 1 will now be described in relation to the waveforms of FIG. 3. The waveforms of FIG. 3 represent signals produced by associated components of the seismic intrusion detector of the present invention in response to, for example, bursts of seismic vibrations in the earth of the type produced by the footfalls of a walking or running man. The energy bursts in the seismic signals will cause divider 24 to provide the energy ratio signal shown at (A) by waveform 124. The energy peaks which exceed threshold value 124' appear at the base of transistor Q1 as illustrated at (B) by curve 128a. Transistor Q1 functions as an emitter follower to provide, at its emitter, the waveform shown at (C) by curve 128b. As previously discussed, waveform 128b rises to the maximum peak level value of the detected peak signal and is discharged by the leading edge of each subsequently detected peak-pulse. The outpt of filter circuit 32 provides an average maximum peak level signal which is represented at (D) by curve 128c. The output of divider 24, which is represented at (A) by curve 124, is also detected by DETECTOR 26 to provide a detected digital peak-pulse signal as depicted by curve 142. As previously discussed, this detected digital peak-pulse signal is subsequently pulse-width-limited. In this regard the threshold value +$V_1$ of DETECTOR 26 and the combined Zener diode and base-emitter drop of $Q_1$ of DETECTOR 28 are preferably arranged to provide equal peak threshold values as represented at (A) by dashed line 124'.

The curves at (F) in FIG. 3 show the relationship of the peak-rate sawtooth signal output of PEAK-RATE INTEGRATOR 50, depicted by curve 152, to the peak-rate average consistency limits, depicted by curves 172 and 173. The output of peak-rate CONSISTENCY DETECTOR 70 is shown at (G) by curve 174. The output of the gated amplifier of WEIGHTED CONSISTENCY INTEGRATOR 80 is depicted at (H) by curve 182. The correspondence of the amplitude characteristics of curve 182 to the average maximum peak level curve 128c, due to the weighted consistency function of INTEGRATOR 80, should be noted. The integrated value of curve 182, as provided by integrating capacitor 85 is depicted at (I) by curve 185. Dashed line 190 shows the relationship between the threshold level of DECISION CIRCUIT 90 and the integrated weighted consistency signal, provided at capacitor 85. Finally, the signal provided at detector decision output 90 is depicted at (J) by curve 192.

Although the preferred embodiment of the present invention incorporates ANALOG PEAK DETECTOR 28, it has been found that good results are nevertheless obtainable without this function.

It should now be appreciated that the seismic intrusion detector of the present invention detects those seismic signals which satisfy a given energy peak and periodicity requirement as finally determined by the given threshold voltage applied to DECISION CIRCUIT 90. Moreover, the detector discriminates against seismic signals which do not have a periodic characteristic. Further, increased signal discrimination is provided by the analog energy peak requirement. Now, since an intruder's footfalls generate bursts or peaks of seismic energy and are characteristically periodic, the intrusion detector of the present invention provides a highly effective detector which detects seismic footfalls but which discriminates against non-footfall seismic signals.

What has been taught, then, is a seismic intrusion detector facilitating, notably, the detection of footfall signals caused by one or more walking or running intruders. In operation, the ETSID of the present invention shows excellent descrimination in detecting intruders from a variety of seismic signals. The detector proved capable of detecting single or multiple intruders in a variety of seismic backgrounds of wind and rain. In normal background noise, single intruder detection occurs at a maximum range as defined by selected system parameters, while the maximum range degrades gradually as the number of intruders or background noise increases. Non-intruder seismic signals of high background noise from wind and rain, operating vehicles a generator and a helicopter were all rejected by the detector. While the ETSID was implemented with standard commercial integrated circuitry, this detector is also capable of being implemented in low power circuitry thereby facilitating the requirements of an accurate, low power and inexpensive seismic intrusion detector.

The form of the invention illustrated and described herein is the preferred embodiment of these teachings, in the form currently preferred for manufacture. It is shown as an illustration of the inventive concept, however, rather than by way of limitation, and it is pointed out that various modifications and alterations may be indulged in within the scope of the appended claims.

Having thus described the invention, what I claim as new and desire to protect by United States Letters Patent is:

1. A seismic intrusion detector for discriminating between periodic energy bursts and other seismic signals, said detector comprising:
   1. input means for receiving seismic energy signals;
   2. means coupled to said input means for detecting energy peaks from energy bursts in said seismic signals;
   3. means coupled to the detecting means and responsive to the detected energy peaks for producing a first signal, said first signal having an amplitude proportional to the average rate of the detected peaks and said first signal having a time-varying amplitude component indicative of the period of each of said peaks;
   4. means for producing a second signal indicative of the average amplitude of said first signal;
   5. means for comparing said first and second signals to provide a third signal when the time-varying component of said first signal is within a predetermined range about said second signal; and
   6. means coupled to said comparing means and responsive to said third signal for providing an output signal when the integrated value of said third signal exceeds a predetermined level.

2. The intrusion detector according to claim 1, wherein said detecting means includes analog means for producing an analog signal whose amplitude varies in accordance with the amplitude of said detected energy peaks and wherein said analog means includes means coupled to the means responsive to said third signal, for weighting the integration of said third signal in response to the amplitude of said energy peaks to cause the integrated value of said third signal to vary in accordance with the amplitude of said energy peaks.

3. The intrusion detector according to claim 2, wherein said analog means includes means for integrating said analog signal so that the integrated value of said third signal varies in accordance with the average amplitude of said energy peaks.

4. The intrusion detector according to claim 1, wherein:
   said means for producing a first signal comprises an operational amplifier having an input coupled to said detecting means and an output coupled to said comparing means, and wherein the output of said amplifier is coupled to its input, thereby to form an operational amplifier integrator; and
   said means for producing a second signal comprises an integrator network having an input coupled to the output of said amplifier and an output coupled to said comparing means.

5. The detector according to claim 4, wherein said comparing means includes first and second comparators each comparator having a first input coupled to the output of said integrator network and a second input coupled to the output of said amplifier, and each comparator having an output coupled to the means responsive to said third signal.

6. The detector according to claim 5, wherein said comparing means further includes a third comparator having a first input coupled to a threshold potential and a second input coupled to said integrator network, said third comparator including means for inhibiting said third signal until the average amplitude of said first signal exceeds said threshold potential.

7. The intrusion detector according to claim 1, wherein said detecting means comprises:
   rectifier means for rectifying said seismic energy signals said rectifier means having an input coupled to said input means and said rectifier means having an output;
   first integrator means having an input coupled to said output of said rectifier, said first integrator means being responsive to the instantaneous energy of said rectified seismic signals;
   second integrator means having an input coupled to the output of said rectifier, said second integrator means being responsive to the average energy of said rectified seismic signals; and
   divider means having an input coupled to said first and second integrator means and an output for providing an energy ratio signal indicative of the ratio of said instantaneous energy to said average energy, wherein a burst of seismic energy in said seismic signals results in an energy peak signal at said output of said divider means.

8. The intrusion detector according to claim 7, wherein said detecting means further includes threshold means coupled between said divider means and the first signal producing means, for detecting only those energy peaks which exceed a given threshold level.

9. The intrusion detector according to claim 8, wherein said detecting means includes a digital peak detector for generating a peak-pulse in response to each detected energy peak, wherein the width of each peak-pulse is related to the time duration during which the corresponding energy peak exceeds said given threshold level.

10. The intrusion detector according to claim 9, wherein said first signal producing means includes peak-pulse shaping means for limiting the maximum pulse width of the peak-pulses, so that each width-limited peak-pulse is equal to or less than a given fixed width; and wherein said first signal producing means includes integrator means responsive to each width-limited peak-pulse wherein said integrator means charges during the time duration of each width-limited peak-pulse and wherein said integrator means discharges during the time duration between successively occurring peak-pulses.

11. A seismic intrusion detector comprising, in combination:
  a. input means for receiving seismic energy signals;
  b. means coupled to said input means for amplifying and filtering said seismic signals, to provide an amplified version of said seismic energy signals within a predetermined bandwidth;
  c. rectifier means coupled to said amplifying and filtering means for rectifying the amplified signals;
  d. first and second integrator means, each coupled to said rectifier means for respectively providing signals representative of the instantaneous and average value of said seismic energy signals;
  e. divider means coupled to said first and second integrator means for providing an energy ratio signal indicative of the ratio of said instantaneous to said average signals, wherein energy bursts in said seismic energy signals provide energy peaks in said energy ratio signal;
  f. digital peak detector means coupled to said divider means for providing a digital peak-pulse output signal in response to each energy peak which exceeds a given threshold value, each digital output signal having a pulse-width indicative of the duration of the corresponding energy peak;
  g. peak-rate integrator means coupled to said digital peak detector means for providing an integrated output signal having a level indicative of the period of each digital output signal and the average rate of previously detected digital output signals;
  h. peak-rate averager means coupled to said peak-rate integrator means for providing an output signal having a level indicative of the average level of the output signal provided by said peak-rate integrator means;
  i. consistency detector means including comparison means coupled to said peak-rate integrator means and said peak-rate averager means for providing a consistency output signal when the level of the output signal provided by said peak-rate integrator means is within a predetermined range about the level of the signal provided by said averager means; and
  j. detector decision output means coupled to said consistency detector means for providing a decision output signal when the integrated value of said consistency output signal exceeds a given threshold value.

12. The intrusion detector according to claim 11, including analog peak detector means coupled between said divider means and said detector decision output means for providing an analog signal to weight the value of said consistency output signal in accordance with the amplitude of the energy peaks which exceed a given threshold value.

13. The intrusion detector according to claim 12, wherein said peak-rate integrator means includes means responsive to said digital output signals for providing a time-varying integrated output signal, said time-varying signal having a leading edge wave-form level indicative of the pulse-width of said digital output signals and having a trailing edge waveform level indicative of the duration between successively occurring digital output signals.

14. The intrusion detector according to claim 13, wherein said time-varying signal is a sawtooth signal and wherein the trailing edge waveform level is controlled by circuit means having a time-constant on the order of 2 seconds.

15. The intrusion detector according to claim 11, further including pulse-width limiting means coupled between said digital peak detector means and said and said peak-rate integrator means, for limiting the maximum pulse width of said digital output signals to a given value.

* * * * *